Jan. 19, 1960     E. A. HELMKE     2,921,451
CONSTANT VELOCITY UNIVERSAL JOINT STRUCTURE
Filed July 14, 1958
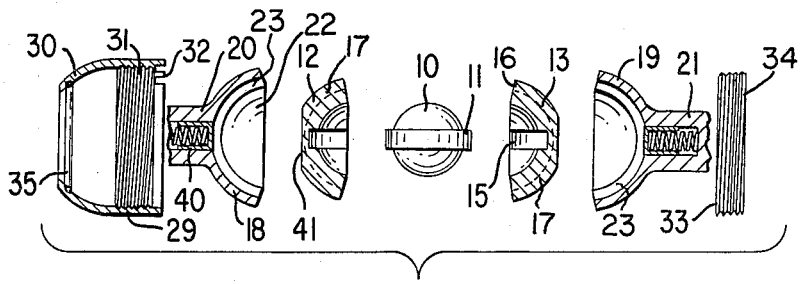
Fig. 1
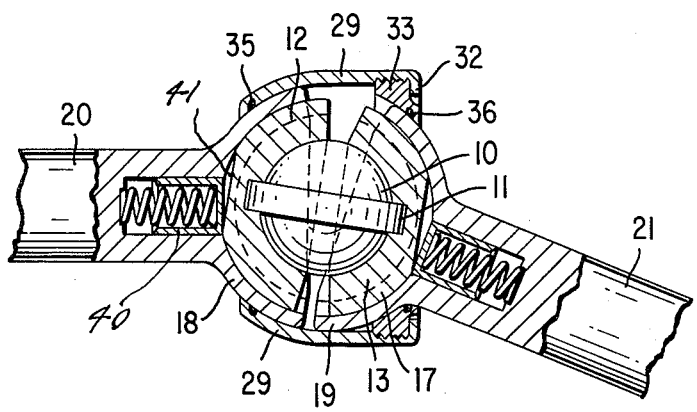
Fig. 2
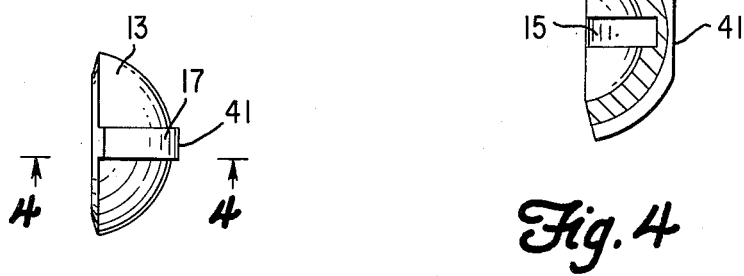
Fig. 3
Fig. 4
INVENTOR.
EMIL A. HELMKE
BY
ATTORNEY

United States Patent Office 2,921,451
Patented Jan. 19, 1960

2,921,451

CONSTANT VELOCITY UNIVERSAL JOINT STRUCTURE

Emil A. Helmke, Detroit, Mich.

Application July 14, 1958, Serial No. 748,295

1 Claim. (Cl. 64—21)

This invention relates to a universal joint of extremely simple, inexpensive and durable construction which effectively operates to connect a driving shaft and a driven shaft in such manner as to permit true universal movement of either shaft, yet maintains a driving connection between the two, it being an important object to produce a new and improved constant angular velocity universal joint, having a minimum of parts and so designed as to be relatively easy to assemble and can be produced economically in large scale production.

For purposes of illustration, but not of limitation, an embodiment of the invention is shown on the accompanying drawings in which Figure 1 is an exploded view and in vertical section of the joint;

Figure 2 is a longitudinal sectional elevation of a constant angular velocity universal joint embodying the invention;

Figure 3 is a side view of one of the inner semipherical shells; and

Figure 4 is a sectional view substantially on the line 4—4 of Figure 3.

The illustrated embodiment of the invention comprises a constant velocity universal joint which embodies a solid metallic ball or sphere 10 disposed near the center of the joint. Rigid with and preferably integral with the sphere 10 is an outwardly extending cylindrical flange or key 11 having flat opposite sides and being disposed centrally of the sphere so that equal portions of the sphere are arranged on opposite sides of the key. The driving force transmitted from the driving to the driven parts is transmitted through the sphere 10 by way of the cylindrical key 11.

On each side of the central sphere 10 are substantially semi-spherical shells 12 and 13 which are identical in form. The inside surface of each of the shells 12 and 13 is semi-spherical and intimately fits the juxtaposed surface of the sphere 10 and has a nice sliding fit thereon. In each of the shells 12 and 13 is a semi-circular key way into which portions of the key 11 slidingly fit. It will be understood that the shells 12 and 13 are dimensioned so that when fitted to the central sphere 10, they do not abut each other. On the contrary slight spacing is provided between the facing surfaces of these two shells when the up and down edges thereof are substantially parallel. It will be observed that the inner edges of the shells 12 and 13 incline rearwardly as indicated at 16. The outer surface of each of the shells 12 and 13 is also substantially semi-spherical and concentric with the inside substantially semi-spherical contour. The thickness of the shells 12 and 13 is so chosen that adequate strength is afforded these parts after the key way to receive the key 11, has been formed therein. At exactly 90° to the key way 15 of each of the shells 12 and 13 is a key 17 which projects outwardly beyond the dome-like outer surface of each shell.

On the outside of the shells 12 and 13 are main exterior shells 18 and 19 respectively, the shell 18 having a shaft part 20 which is the driving end of the joint and the shell 19 having a shaft part 21 constituting the driven part of the joint. The exterior shells 18 and 19 are of the same construction except that the stell 19 is provided with lubricating means which will be hereinafter described. As shown, each of the main exterior shells has an inner substantially semi-spherical surface 22 contoured to have a nice sliding fit with the exterior surface of the adjacent inner shell. In each of the shells 18 and 19 is a key way 23 for slidingly receiving the key 17 of the adjacent inner shell so that a sliding fit is obtained between these parts. The key way 23 is bisected by the axis of the shaft part 20. A pair of oppositely arranged spring-tensioned pistons 40 are slidable in the exterior shells 18 and 19 respectively. The pistons 40 engage flattened surfaces 41 on the shells 12 and 13 respectively, thereby tending at all times to centralize the driving and driven shells. The surfaces 41 are formed on each of the keys 17 as shown on Figures 3 and 4.

The outer surface of each of the main shells 18 and 19 is dome-shaped, the curvature of which is concentric to that of the sphere 10. Thus the various semi-spherical surfaces on opposite sides of the central sphere 10 are concentric to such sphere.

The parts of the joint are retained in assembled relation by a housing having a main straight tubular body 29, the inner end of which is curved as indicated at 30 to conform to the curvature of the outer surface of the adjacent main shell 18 and the opposite end portion is provided with a series of screw threads 31 on the inside thereof. Thus the main body 29 has a sliding fit with the main shell 18, and it is of sufficient length to extend over the parts of the joint and of such diameter as to clear same. At the outer end of the body adjacent the screw threads is a series of fingers or tabs 32 which are spaced from each other and extend throughout the circumference of the housing part. In screw-threaded engagement with the thread 31 of the main housing body 29 is an externally threaded ring 33 which has a curved inner surface slidingly fitting the exterior surface of the main shell 19. In the outer end of the ring 31 is an annular row of spaced grooves into which the fingers 32 are bent thereby securing the housing part together and militating against relative turning movement between these parts. It is not necessary that there be sufficient of the grooves 34 to accommodate each of the fingers 32 so that some of the fingers may be bent over the outer end of the ring 33. In the housing part 29 is an annular groove 35 to receive a grease seal and likewise in the inside of the ring 33 is a groove to receive a grease seal 36.

From the above description, it will be understood that the inner shells 12 and 13 are free to rock in one direction or the other on the sphere 10 as well as relative to the respective main shells 18 and 19. When the joint is operating at an angle, these parts slide freely in both of these directions, maintaining the key ways 23 in the main shells 18 and 19 in perfect alignment with each other. These internal movements of the joint parts are self-compensating in their true round contained position. This constant true alignment of the key ways of the main shells 18 and 19 makes possible the delivery of a constant velocity.

Reference is hereby made to my United States Patent 2,843,968 dated July 8, 1958 and in which certain of the parts shown and described in this application also appear.

What I claim is:

A universal joint comprising an exterior driving shell, an exterior driven shell, an interior shell for said driving shell, an interior shell for said driven shell, a socket disposed centrally of each exterior shell and opening to the inside thereof, a cup-shaped piston slidable in each socket with the closed end thereof adjacent the open end of the socket, a helical coil spring in each socket urging the respective piston outwardly thereof, a flat on the outside of each interior shell engageable by a piston thereby tending to centralize the interior shells, a central free floating sphere engaged by both interior shells, a continuous cylindrical key surrounding said central sphere, a key way in each interior shell receiving a portion of said sphere key whereby the driving and driven shells are maintained at 180° angularity, interfitting keys and key ways connecting said interior shells and the respective driving and driven shells and arranged at 90° relative to said sphere key, the engaging surfaces of said interior and exterior surfaces being curved and concentric with said central sphere, and a housing having separable parts enclosing and having curved bearing surfaces slidingly engaging said exterior shells for respectively retaining the parts assembled.

References Cited in the file of this patent
UNITED STATES PATENTS

| | | |
|---|---|---|
| 1,145,401 | Bowen | July 6, 1915 |
| 1,968,925 | Barish | Aug. 7, 1934 |
| 2,293,204 | Greenfield | Aug. 28, 1942 |
| 2,841,968 | Helmke | July 8, 1958 |